United States Patent [19]
Crabtree

[11] Patent Number: 5,123,803
[45] Date of Patent: Jun. 23, 1992

[54] STERN DRIVE HANDLING DEVICE

[76] Inventor: George F. Crabtree, P.O. Box 771135, Winter Garden, Fla. 34777

[21] Appl. No.: 580,750

[22] Filed: Sep. 11, 1990

[51] Int. Cl.[5] .................................................. B62B 1/26
[52] U.S. Cl. ........................... 414/621; 280/DIG. 2; 269/17; 414/666; 414/495; 414/590
[58] Field of Search ............... 414/458, 459, 495, 589, 414/590, 620, 621, 639, 643, 663, 664, 668, 665, 666, 669, 670, 671; 280/DIG. 2; 254/134; 269/17, 76, 71

[56] References Cited

U.S. PATENT DOCUMENTS

| | | | |
|---|---|---|---|
| 1,823,204 | 9/1931 | Long | 269/71 X |
| 2,188,433 | 1/1940 | Friese | 269/78 X |
| 2,576,660 | 11/1951 | Williams | 414/620 X |
| 2,781,920 | 2/1957 | Burington | 414/589 |
| 3,045,851 | 7/1962 | Rupert | 414/621 |
| 3,089,602 | 5/1963 | Hunziker | 414/621 |
| 3,174,634 | 3/1965 | Peck | 414/620 X |
| 3,289,873 | 12/1966 | Hansen | 414/671 |
| 3,591,028 | 7/1971 | McClung, Jr. | 414/620 X |
| 3,858,864 | 1/1975 | Waldow | 269/17 |
| 4,010,942 | 3/1977 | Ward | 269/17 X |
| 4,044,978 | 8/1977 | Williams | 280/DIG. 2 |
| 4,084,706 | 4/1978 | Russell | 414/620 X |
| 4,254,946 | 3/1981 | Kerr et al. | 269/76 X |
| 4,527,942 | 7/1985 | Smith | 414/665 X |
| 4,530,492 | 7/1985 | Bork | 269/17 |
| 4,570,960 | 2/1986 | Peetz | 280/DIG. 2 |
| 4,659,072 | 4/1987 | De La Rosa | 269/17 |
| 4,796,861 | 1/1989 | Petty | 254/134 X |
| 4,810,151 | 3/1989 | Shern | 414/590 X |
| 4,913,614 | 4/1990 | O'Rarden | 414/458 X |

Primary Examiner—Robert J. Spar
Assistant Examiner—James Eller
Attorney, Agent, or Firm—Sughrue, Mion, Zinn, Macpeak & Seas

[57] ABSTRACT

A stern drive handling device includes a wheeled lower support frame and an extensible upper support frame telescopically mounted on the lower support frame. A horizontally disposed hollow sleeve is secured to the upper end of the upper support frame and a screw jack is provided for adjusting the height of the sleeve relative to the lower support frame. A support bracket assembly is pivotally mounted in the sleeve for swinging movement about a horizontal axis and a pair of pivoted clamps adapted to engage the cavitation plates on the housing of a stern drive unit are pivotally mounted on the support bracket assembly for pivotal adjusting movement about a second horizontal axis orthogonal to the first horizontal axis. The clamps may be secured in any desired pivoted position and limit stops are provided to limit the pivoting movement of the clamps.

2 Claims, 3 Drawing Sheets

STERN DRIVE HANDLING DEVICE

BACKGROUND OF THE INVENTION

The present invention is directed to a stern drive handling device and more specifically to a wheeled support frame having an adjustable clamping frame adapted to support a stern drive assembly for a boat for removing and installing the stern drive relative to an onboard motor.

The use of wheeled support frames having an adjustable clamping frame movably mounted thereon for holding and positioning a large work piece such as a boat, an engine, a knitting head or the like, are old and well known in the art.

The upper frame is generally mounted for vertical movement relative to the lower support stand and is further provided with a substantially horizontally projecting clamping frame which is further adjustable about one or more additional axes to provide accurate positioning of the work piece in any desired position.

An example of such a prior art work handling device is disclosed in the U.S. patent to Lucker et al. (U.S. Pat. No. 2,997,292) which is directed to a boat jack. An upper frame is movably mounted upon a wheeled lower support frame for vertical adjusting movement and a clamping member adapted to engage a boat is mounted on the upper frame for pivotal movement about two orthogonal horizontal axes. Boat engaging means are mounted on the clamping member and are specifically designed to either clamp the transom of the boat or a special fitting secured to the bow of the boat.

The U.S. patent to DeLaRosa (U.S. Pat. No. 4,659,072) discloses a knitting machine head extractor having a wheeled lower support frame and a vertically movable upper frame having a horizontally disposed support frame extending therefrom with laterally adjustable arms for underlying and supporting a knitting machine head. An additional vertically adjustable clamp is secured to the support frame which is also mounted for rotation about a horizontal axis on the vertically adjustable upper frame.

The U.S. patent to Kaplan et al (U.S. Pat. No. 3,218,056) discloses an engine positioning stand having a wheeled lower support frame mounted for rotation about a horizontal axis for rotatably supporting an engine in the desired position.

The U.S. patent to Long (U.S. Pat. No. 1,823,204) discloses an automobile radiator work stand having a wheeled lower support and an upper support mounted on the lower support for vertical adjustment relative thereto. A horizontally extending radiator support frame is rotatably mounted on the upper stand for rotation about a horizontal axis and is provided with a pair of parallel horizontally extending arms with means provided for adjusting the spacing between the arms. The U.S. patent to Friese (U.S. Pat. No. 2,188,433) discloses a similar work holding device for supporting an automobile door in the desired position.

The U.S. patent to Kerr et al. (U.S. Pat. No. 4,254,946) discloses a repair fixture for supporting an outboard motor by means of a rotatable clamp adapted to engage the horizontal fin elements on opposite sides of the lower unit of an outboard motor.

SUMMARY OF THE INVENTION

The present invention provides a new and improved work handling device having a unique clamping arrangement for engaging and securing a stern drive unit in a plurality of positions to facilitate the removal and installation of a stern drive unit relative to a boat having an inboard motor.

The present invention provides a new and improved stern drive handling device comprising a lower support unit having wheels to facilitate transport of the device and a vertically disposed tubular support thereon, an upper support unit having a vertically disposed support member telescopically mounted in said vertical tubular support and a horizontally disposed tubular support secured to an upper end of the vertically disposed support member, drive means operatively connected between said upper and lower support units for vertically moving said upper support unit relative to said lower support unit, and support bracket means detachably connected to said upper support unit for supporting a stern drive unit, said support bracket means comprising a horizontally disposed U-shaped bracket, a support post extending upwardly from a base portion of said U-shaped bracket having a horizontal projection at an upper end thereof rotatably received in said horizontally disposed tubular support member, clamping means adapted to secure said support bracket means in the desired angular relationship relative to said upper support unit, a pair of support plates pivotally mounted on respective arms of said U-shaped bracket and adapted to engage horizontal stabilizer fins on said stern drive, clamping means on said plates adapted to clamp said fins to said plates and limit means adjustably secured to said support posts for limiting pivotal movement of said plates on said U-shaped bracket.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
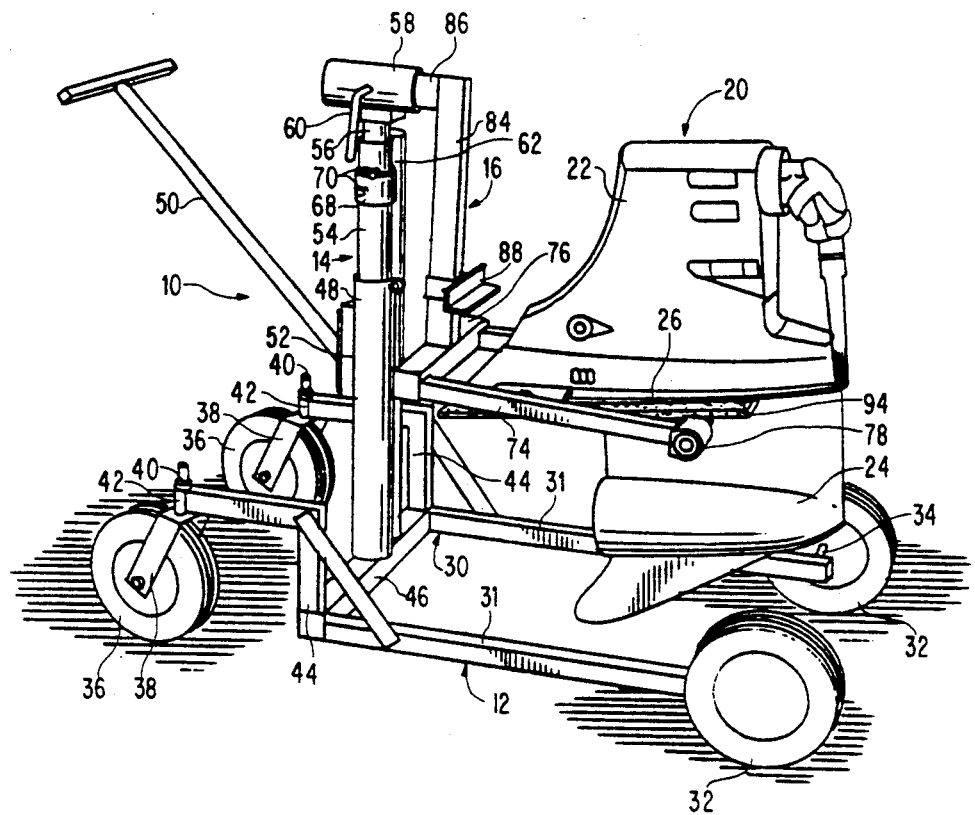
FIG. 1 is a perspective view of a stern drive handling device according to the present invention showing a stern drive unit supported thereon.

The stern drive handling device 10 as shown in FIG. 1, is specifically designed to support and transport the stern drive assembly 20 having an upper transmission housing 22, a lower propeller shaft housing 24 and an intermediate cavitation plate 26 which extends laterally outwardly on opposite sides of the housing. The stern drive assembly is adapted to be supported on the handling device 10 by means of the cavitation plate 26. Since stern drive assemblies can weight up to 150 pounds, it is difficult to manually remove or attach the stern drive assemblies to a boat, especially in view of the difficulties posed by the fact that many boats are now being built with swim platforms attached to the transom. The handling device according to the present invention provides a power lifting mechanism to raise or lower the assembly with the support bracket being angularly adjustable on the support frame and the support plates being angularly adjustable on the support bracket to properly position the stern drive assembly relative to the boat.

The stern drive handling device 10 is comprised of a lower support unit 12, an upper support unit 14 and a support bracket assembly 16. The upper support unit 14 is mounted for telescopic vertical sliding movement relative to the lower support unit 12 and the support bracket assembly 16 is mounted for pivotal movement about a horizontal axis relative to the upper support unit 14.

The lower support unit 12 is comprised of a substantially U-shaped frame 30 having a pair of front wheels 32 mounted for rotation on horizontal axles 34 carried by the respective legs 31 of the U-shaped frame 30 at the forward ends thereof. The two rear wheels 36 are mounted for rotation in swivel brackets 38 having pins 40 mounted for pivotal movement within sleeves 42 secured to rearwardly extending inverted L-shaped brackets 44 mounted on the upper surface of the U-shaped frame 30 at opposite ends of the cross piece 46. A vertically disposed tubular member 48 is secured to the middle of the cross member 46 and a suitable handle 50 is secured to a support plate 52 on the tubular member 48 for pushing or pulling the handling device in a desired direction. The swivel brackets 38 allow the rear wheels to turn, thereby providing additional mobility for the handling device.

The upper support unit 14 is comprised of two tubular members 54 and 56 disposed in telescopic relation with respect to each other. The hollow tubular member 54 is in turn mounted for telescopic sliding movement within the tubular member 48 mounted on the lower support unit. A horizontally disposed tubular support sleeve 58 is secured to the upper end of the tubular member 56 at right angles thereto. A threaded clamping member 60 is threaded in an opening in the tubular sleeve 58 for clamping a telescopic rod within the sleeve 58.

Figure 2:
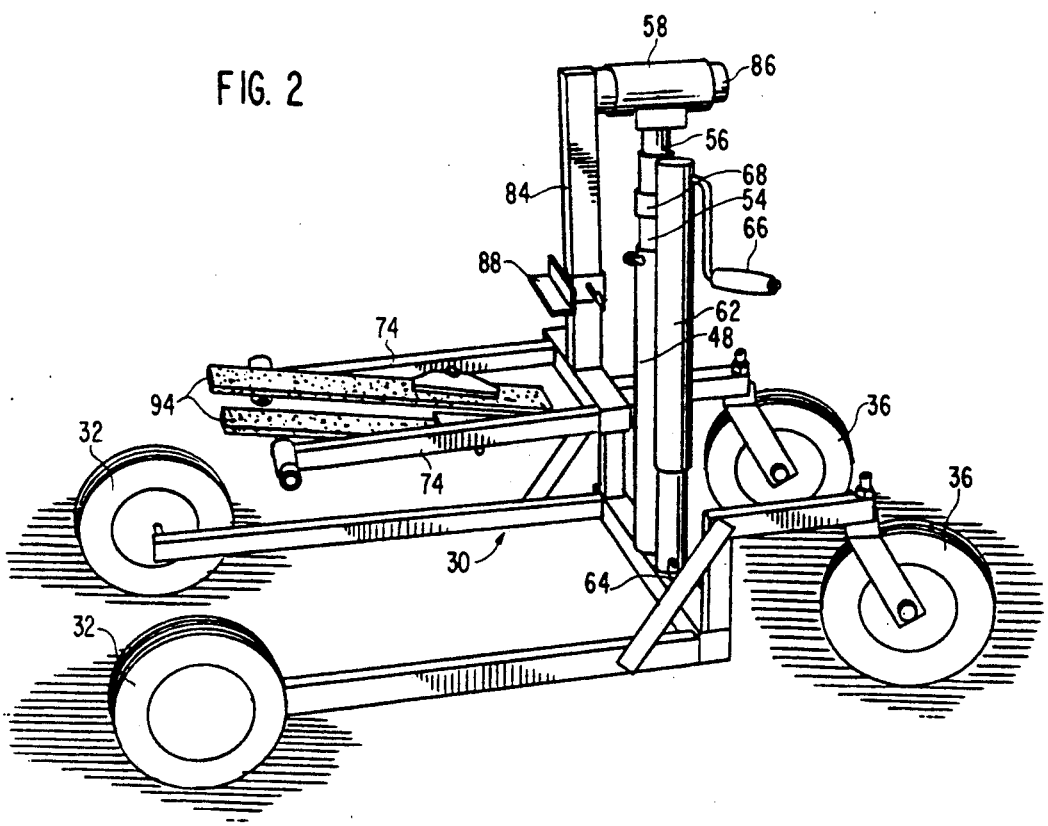
FIG. 2 is a perspective view of the stern drive handling device from the opposite side as viewed in FIG. 1 without the stern drive unit.
Figure 3:
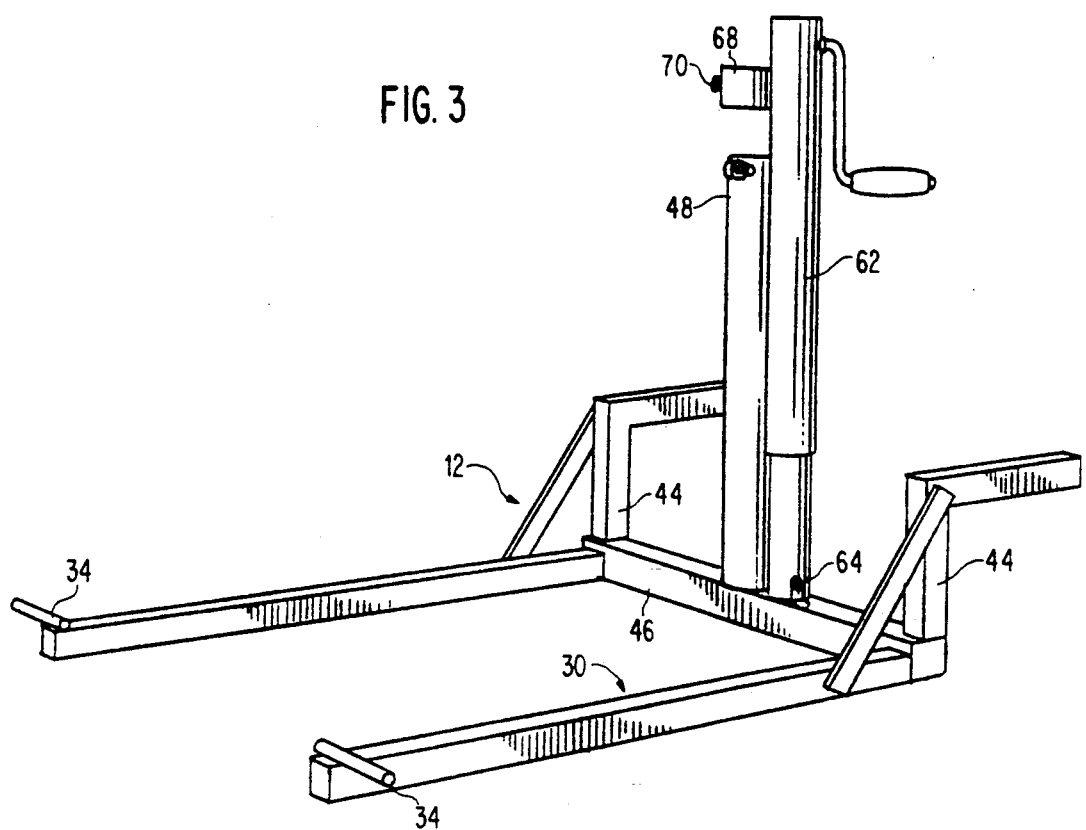
FIG. 3 is a perspective view of the lower support unit of the stern drive handling device.

A conventional screw jack 62 comprised of upper and lower telescopic members is mounted vertically on the U-shaped frame 30 parallel to the tubular support 48 by means of a pair of brackets 64, one of which is shown in FIG. 2. The screw jack 62 is provided with an operating handle 66 and a short hollow tubular sleeve 68 is secured to the screw jack 62 adjacent the top end thereof with the tubular sleeve 68 being in vertical alignment with the tubular support 48. The telescopically disposed tubular members 54 and 56 are telescopically disposed within the support member 48 and the tubular sleeve 68. The tubular members 54 and 56 and the tubular sleeve 68 can be secured relative to each other in any desired position by means of clamping bolts 70 carried by the tubular sleeve 68 and the tubular member 54, as best seen in FIG. 1. With the tubular sleeve 68 clamped to the tubular member 54, the operation of the screw jack to vertically extend the screw jack will cause upward movement of the sleeve 68 and the tubular member 54 connected thereto. Thus, the horizontally disposed tubular support sleeve 58 can be adjusted vertically by means of the screw jack 62.

Figure 4:
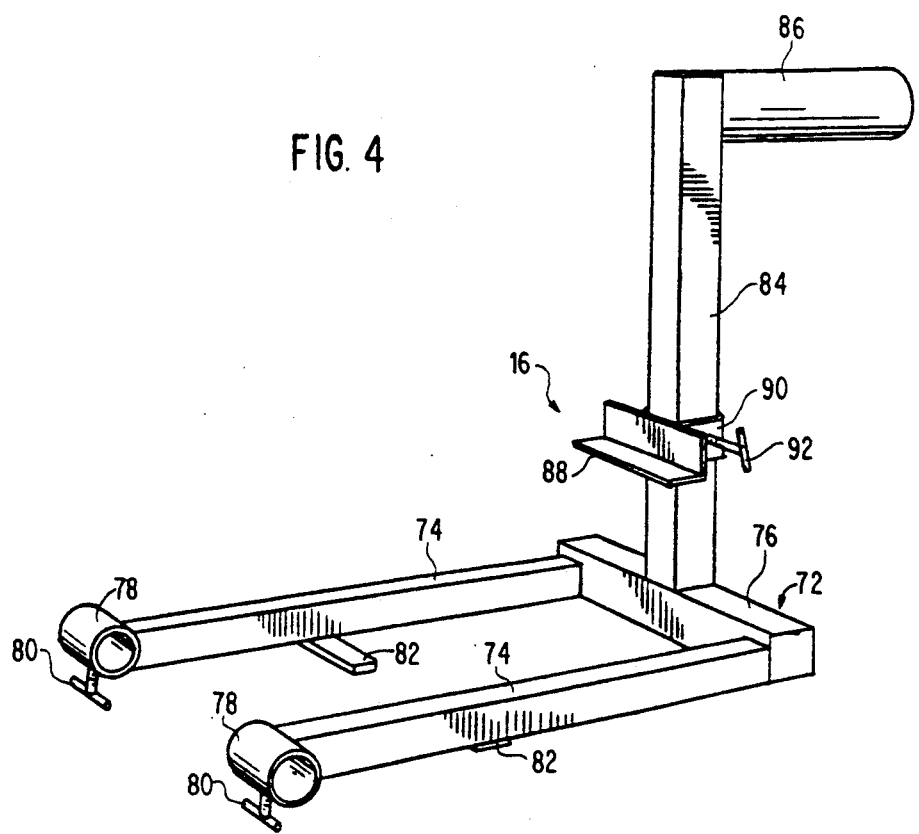
FIG. 4 is a perspective view of the support bracket assembly adapted to be connected to an upper support unit.
Figure 6:
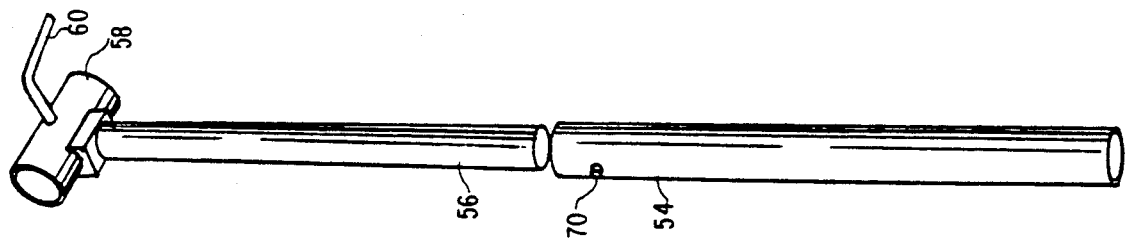
FIG. 6 is an exploded view of the upper support unit of the stern drive handling device.
Figure 5:
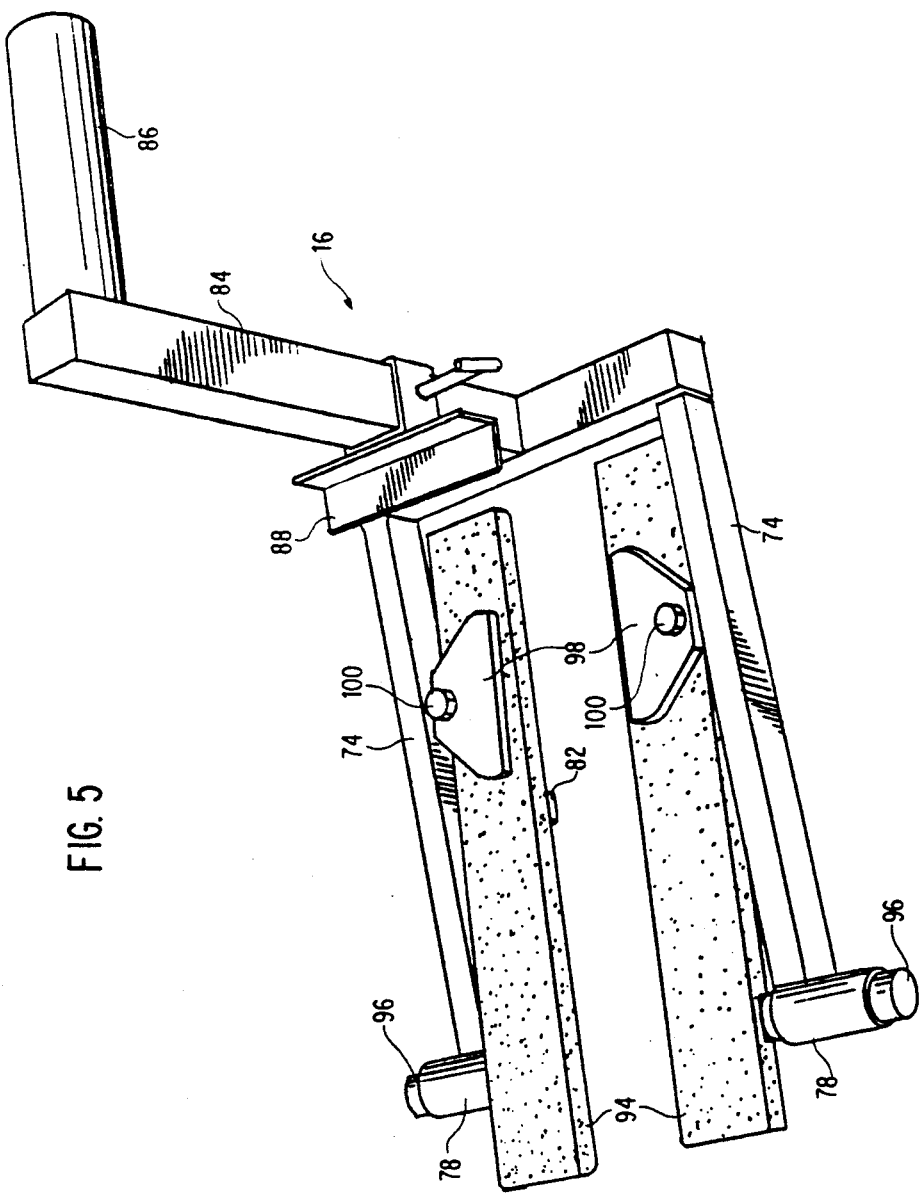
FIG. 5 is a perspective view of the support bracket of FIG. 4 with the support plates pivotally mounted thereon and a limit stop adjustably secured thereto.

The support bracket assembly 16 is shown in combination with the upper and lower support units 12 and 14 in FIGS. 1 and 2 and is more specifically shown by itself in FIGS. 4 and 5. The support bracket assembly 16 is comprised of a U-shaped frame member 72 comprised of a pair of parallel spaced apart legs 74 secured at one end to a base member 76 and having a pair of hollow tubular supports 78 secured at the opposite ends thereof with the axes of the hollow tubular supports 78 being in alignment. A clamping screw is threaded into each support member 78. A pair of horizontally disposed, inwardly extending limit stop plates 82 are secured at approximately the mid points of the legs 74. A support post 84 is secured to the upper surface of the mid portion of the base member 76 at right angles thereto and a horizontally extending tubular support post 86 is secured to the upper end of the vertically disposed support post 84 at right angle thereto. An L-shaped plate 88 is secured to a sleeve 90 which is slidably mounted on the vertically extending support post 84. The L-shaped plate 88 may be secured at any desired position along the length of the vertically disposed support member 84 by means of a threaded clamping member 92 extending through the sleeve 90. The horizontally disposed support post 86 is secured in the hollow tubular sleeve 58 and clamped therein by means of the screw threaded clamp 60. The angular orientation of the support bracket assembly 68 about the horizontal axis of the tubular sleeve 58 can be varied by rotating the horizontal post 86 within the sleeve 58 and clamping the post in the desired angular position. A pair of flat support pads 94 are each provided with a pivot pin 96 adjacent the forward end thereof. Pins 96 are adapted to be pivotally supported in the tubular sleeves 78 at the forward ends of the legs 74 of the U-shaped frame 72. The angular position of the pads 94 relative to the legs 74 may be varied by rotating the pins 96 within the sleeves 78 and clamping the pins in the adjusted position by means of the screw threaded clamps 80. The pivotal movement of the pads 94 in the clockwise direction as viewed in FIGS. 2 and 5, is limited by means of the limit stops 82 and the pivotal movement of the pads 94 in the counterclockwise direction is limited by the limit stop plate 88 adjustably mounted on the vertically disposed support post 84. The cavitation plates 26 of the stern drive unit 20 are adapted to rest on the support pads 94. The support pads 94 may be covered with a soft non-abrasive material so as to prevent scratching of the paint on the cavitation plates 26 and the spacing of the pads 94 may be varied by shifting the pivot pins 96 laterally within the support sleeves 78. A clamping pad 98 is secured to the upper surface of each support pad 94 by means of a bolt 100. The clamping pads 98 are adapted to engage the upper surface of the cavitation plates 26 for clamping the stern drive unit 20 in position on the support pads 94. The clamping pads 98 may be of any suitable non-abrasive material such as plastic or the like.

The various components of the support units and support brackets may be of steel, with the components welded together in the appropriate configuration. While a screw jack 62 has been used as the means for raising and lowering the support bracket assembly 16, other types of jack mechanisms may be utilized. The screw jack is preferred since positioning is possible in the up and down direction in very small increments. The stern drive unit 20 can readily be worked upon while supported by the handling device 10 and then transported to the boat for coupling with the inboard motor. The angle of the support pads 94, the angular position of the support bracket assembly 16 and the height of the upper support unit relative to the lower support unit can be varied to accurately position the stern drive unit for proper positioning of the stern drive unit for engagement with the inboard motor.

While the invention has been particularly shown and described with reference to preferred embodiments thereof, it will be understood by those in the art that the foregoing and other changes in form and details may be made therein without departing from the spirit and scope of the invention.

What is claimed is:

1. A stern drive handling device comprising:

lower support means having wheels, upper support means adjustably connected to said lower support means, support bracket means adjustably connected to said upper support means and clamping means adjustably mounted on said support bracket means adapted to engage and clamp a stern drive unit thereon, said clamping means comprising a pair of parallel spaced apart support plates independently and adjustably mounted on said support bracket means for pivotal and lateral adjustment about and along a common axis, and clamping plate means adjustably secured to said support plates for clamping a cavitation plate of said stern drive unit therebetween;

wherein said lower support means includes a vertically disposed hollow tubular support member and said upper support means includes a pair of tubular members telescopically mounted relative to each other and said hollow tubular support member on said lower support means, means for locking said tubular members in adjusted positions, jack means mounted on said lower support means for raising and lowering said tubular members relative to said hollow tubular support, and a hollow tubular sleeve secured to one of said tubular members of said upper support means at right angles thereto; and wherein said support bracket means is comprised of a first support member having a support post secured to an upper end thereof at right angles thereto and adjustably mounted in said sleeve and a U-shaped support bracket having a pair of substantially horizontally extending arms secured at right angles to said first support member with said support plates being pivotally mounted on said arms.

2. A stern drive handling device as set forth in claim 1, further comprising limit stop means mounted on said support bracket means for limiting pivotal movement of said support plates in opposite directions and means for securing said support plates in a plurality of adjusted positions.

* * * * *